March 14, 1944.  H. H. BARBER  2,344,228
MIXING PLANT
Filed July 25, 1941   9 Sheets-Sheet 1

Inventor
HARRY H. BARBER

March 14, 1944.  H. H. BARBER  2,344,228
MIXING PLANT
Filed July 25, 1941  9 Sheets-Sheet 7

Inventor
HARRY H. BARBER

March 14, 1944. H. H. BARBER 2,344,228
MIXING PLANT
Filed July 25, 1941 9 Sheets-Sheet 8

Inventor
HARRY H. BARBER

Patented Mar. 14, 1944

2,344,228

UNITED STATES PATENT OFFICE 2,344,228

MIXING PLANT

Harry H. Barber, Aurora, Ill., assignor to Barber-Greene Company, Aurora, Ill., a corporation of Illinois Application July 25, 1941, Serial No. 403,986

25 Claims. (Cl. 259—164)

This invention relates to a mixing plant composed of mobile units adapted for transporation over roads so that the plant can be placed in operation at any desirable central location.

More specifically this invention relates to a plant for producing binder coated aggregate mixes such as bituminized or asphaltic type road paving materials, which plant is equipped with accurate calibrating devices to control the aggregate proportions, the coating material proportions, and the degree of mixing.

The plants of this invention continuously receive raw aggregate at one end thereof and continuously discharge accurately proportioned binder coated and graded aggregate paving material at the other end thereof after drying, classifying, and proportioning the aggregate so that the finished mix will rigidly conform with specifications.

Heretofore, continuous binder coated aggregate production has not been fully satisfactory because a uniform product could not be prepared. Therefore, to conform with rigid specifications, batch mixing processes had to be used which required the weighing of the aggregates, the careful measuring of the coating material, and the mixing of the weighed and measured materials in individual batches. Batch mixing, besides being slow, cumbersome and expensive, does not result in the production of uniform batches because of the difficulty of homogeneously combining large masses of the different segregated materials making up the batch. As a result, the paving material laid along a stretch of road bed will vary quite appreciably.

The present invention now eliminates any variation in aggregate mixes and continuously produces a uniform product so that the finished road can have exactly the same characteristics and structure throughout its length.

Since the plants of the present invention operate continuously, small streams of material can be continuously moved and treated thereby effecting high capacity production with relatively small size equipment.

The plants of this invention volumetrically proportion all materials by means of accurately calibrated measuring devices which, when set for the desired proportions, will continue to deliver such proportions without variation.

It is an important feature of this invention to provide, in a mixing plant, a gradation unit which classifies the aggregate and which proportions the various classifications of aggregates as desired, to produce an accurate aggregate mix.

The plant need only be calibrated once for each type of mix and will continue to supply that specified type of mix without variation until the calibration is changed. As a result the plant can be calibrated on the job with the materials to be actually used and, after the calibration has been made, no further setting of the plant is necessary.

The gradation unit has a plurality of bins serving as surge storage means for the classified aggregates to make possible a steady flow of materials to the mixer in the event of intermittent flow ahead of the gradation unit. The bins normalize the flow through the plant.

Another important feature of the plant of this invention is that the same is composed of individual mobile units which can be readily connected and disconnected so that the entire plant can be assembled from the mobile units in short time for use at any particular point and can then be disassembled and readily transported for setting up at another point closer to the paving job or closer to the source of material.

It is, then, an object of this invention to provide a portable plant adapted for the production of road paving material such as bituminous aggregate.

Another object of the invention is to provide a plurality of mobile units adapted for travel along highways and adapted to be rapidly and easily connected together to form a central plant for successively drying, classifying, proportioning, and bituminizing aggregate to continuously produce paving material of rigidly uniform composition.

A further object of the invention is to provide a portable mixing plant composed of wheeled units adapted for travel along roads.

A still further object of this invention is to provide a plant which continuously classifies aggregate as to size and continuously proportions the classified aggregates in accordance with specifications.

A still further object of this invention is to provide a gradation control unit capable of grading mixed aggregates according to size and further capable of continuously proportioning the various sizes of graded aggregate according to any predetermined specifications without interrupting the flow of the aggregates.

Another object of the invention is to provide mechanism for the rapid calibration of an aggregate proportioning unit so that the unit can be set to continuously deliver proportioned aggregate in accordance with specifications.

Another object of the invention is to produce a plant for continuously making aggregate type road materials which plant need only be calibrated at the beginning of each job.

A still further object of this invention is to provide an aggregate classifier with proportioning gates capable of being set in accordance with a calibration test so that only the proper proportions of the various grades of aggregate can be delivered.

A further object of this invention is to provide calibration apparatus for gate-type proportioning mechanisms.

A further object of the invention is to provide a multi-bin aggregate gradation unit wherein the bins deliver graded aggregate to isolated passageways bottomed by the same conveyor band.

Another specific object of the invention is to provide a gradation unit having classifying screens adapted to be lowered into the bins of the unit for decreasing the over-all height of the unit in transportation.

Other and further objects of the invention will become apparent to those skilled in the art from the following detailed descriptions of the annexed sheets of drawings which, by way of preferred example, illustrate an embodiment of the invention. It will be understood that many other embodiments of the invention are included within the scope thereof even though the same are not specifically illustrated on the drawings.

*General description of plant*

Figures 1, 2, 3, 4, 5:
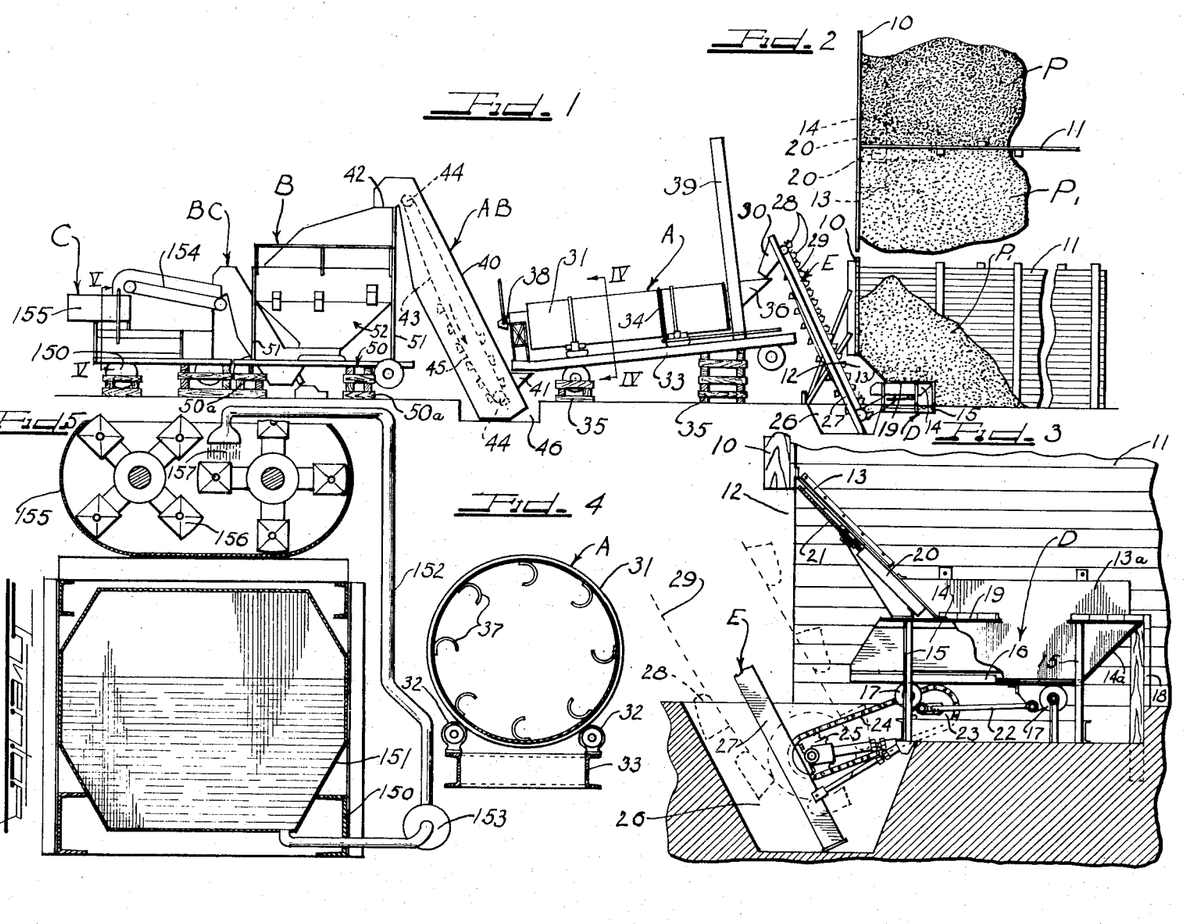
Figure 1 is a somewhat diagrammatic side elevational view of a central mixing plant according to this invention illustrating one manner in which the mobile units of the plant may be set up for operation.
Figure 2 is a top plan view illustrating one manner of arranging the raw aggregate piles for supplying aggregate to the plants of this invention.
Figure 3 is a side elevational view, with parts broken away and shown in vertical cross section, illustrating a twin gate reciprocating feeder for supplying coarse and fine aggregate from the piles illustrated in Figures 1 and 2.
Figure 4 is a transverse cross-sectional view taken along the line IV—IV of Figure 1.
Figure 5 is a transverse cross-sectional view taken along the line V—V of Figure 1.

As best shown in Figure 1, the mixing plant of this invention includes a mobile rotary drum drier A, a mobile gradation unit B, a mobile mixing unit C, an elevator AB between the drier A and the gradation unit B for raising the dried aggregate to the top of the unit B and an elevator BC between the gradation unit B and the mixing unit C for raising graded and proportioned aggregate from the bottom of the unit B to the top of the unit C.

A feeding elevator E raises the raw aggregate from the bottom of the stock piles which, if desired, can in turn be fed by a reciprocating feeder D.

The elevators AB, BC and E can be of the endless conveyor bucket type or of the flight conveyor type. The elevators AB and BC are preferably shrouded.

The main units A, B and C of the plant are respectively mounted on separate wheeled chassis which can be blocked as shown in Figure 1 when the units are positioned for operation.

Three mobile units are thus provided and the elevator AB and the elevator E can be mounted on a separate truck for transportation if desired together with the reciprocating feeder D. The elevator BC can conveniently be mounted on the chassis of the gradation unit B, for travel therewith.

The units of the plant can be arranged for operation in a number of different positions depending upon the plant site. While the units as shown in Figure 1 are mounted in a straight line, they obviously could be arranged in a U-shaped pattern, an L-shaped pattern, a V-shaped pattern, or the like. It is only necessary that the gradation unit be positioned so that it receives dried aggregate from the drier unit A, and that the mixing unit C be positioned so that it receives proportioned aggregate from the gradation unit B. The plant is thus very flexible.

Obviously the elevator E and the reciprocating feeder D could be replaced with a crane for supplying the aggregate to the inlet hopper of the drier A. The bulkhead arrangement of aggregate piles and the reciprocating feeder D mounted in this bulkhead are preferred, however, for feeding a continuously operating elevator such as E so that the feed to the drier A will be continuous instead of intermittent.

In some instances the drier unit A may be eliminated entirely.

*Bulkhead arrangement for aggregate stock piles*

As shown in Figures 1, 2 and 3, a bulkhead front wall 10 is provided with a rearwardly extending dividing wall 11 to form retainer walls for a coarse aggregate stock pile P and for a fine aggregate stock pile P¹. The front wall 10 has an opening 12 at the bottom portion thereof extending on both sides of the dividing wall 11. An inclined plate 13 carried by the feeder D extends on both sides of the dividing wall 11 and slopes downwardly and inwardly from the front wall 10. The plate 13 is secured to the front wall 10 above the opening 12. A dividing plate 13a carried vertically by the feeder D extends above the feeder box longitudinally thereof and the dividing wall 11 is built therearound.

*The reciprocating feeder*

The reciprocating feeder D comprises an open topped and open front box 14 mounted on standards such as 15 in the ground under the bulkhead. The box 14 extends on both sides of the dividing wall 11 and plate 13a and has a movable bottom wall 16 carried on rollers 17 as best shown in Figure 3. The front end of the box extends under the plate 13 while the rear wall 14a of the box is in spaced relation behind the plate. The rear end of the structure is boarded up as at 18 and floor boards such as 19 extend outwardly from the sides of the box so as to provide a platform supporting the stock piles P and P¹ adjacent the box. The platform has an opening therein communicating with the box so that the aggregate will drop through this opening onto the reciprocating plate 16.

Gates 20 are slidably mounted under the plate 13 and are adjustable into and out of the box 14. The positions of the gates are controlled by screw rods such as 21.

The bottom plate 16 is connected through a link 22 with an eccentric 23 which can conveniently be driven through a chain 24 from a sprocket 25 on the bottom portion of the elevator E. The bottom of the elevator E can preferably extend into a pit 26 under the opening 12 in the bulkhead wall 10.

As the aggregate such as stone, sand, or any other suitable material for the preparation of paving mixes drops from the piles P and P¹ into the open topped box 14 the same is moved outwardly from the piles toward the opening 12 by means of the reciprocating plate 16. However, the gates 20 level off the tops of the aggregate charges being moved by the plate 16 so that the relative positions of the gates determines the amount of aggregate discharged from each pile on each stroke of the plate 16. As the plate 16, on its reverse stroke, moves back under the gates the aggregate does not move therewith since the back wall 14a causes the plate to slide under the aggregate. Thus the relative amounts of aggregate fed from each pile P and P¹ into the pit 26 can be roughly controlled by the position of the gates.

Some proportioning of coarse and fine aggregate is thus possible but no classification of aggregate sizes in the respective piles is effected by the feeder.

*The raw aggregate elevator*

The elevator E may be of conventional bucket conveyor type and is mounted so that the lower end of its boom 27 extends into the pit 26 while the upper end thereof is positioned so that the buckets 28 mounted on the conveyor chain or band 29 will discharge into a chute 30 communicating with the inlet to the drier A. The buckets 28 scoop up the aggregate deposited into the pit by the reciprocating feeder D, elevate the same to a height above the inlet of the drier A, and discharge their load so as to supply the drier.

*The aggregate drier*

The drier A, as shown in Figures 1 and 4, comprises a rotary drum 31 rotatably mounted on rollers 32 carried by a wheeled chassis 33 and having a ring gear 34 therearound adapted to be driven by any suitable prime mover for rotating the drum about its longitudinal axis.

The drum 31 is mounted substantially horizontally on the chassis 33 and the chassis can be jacked up or blocked as at 35 to tilt the drum 31 at any desired angle for gravity feeding of the aggregate therethrough.

The chute 30 of the elevator E discharges the aggregate into a hopper inlet 36 at the upper end of the drum and the aggregate falls into the interior of the drum where it is agitated by means of internal baffles or vanes 37 around the inner periphery of the drum.

An oil burner 38 directs a flame into the discharge end of the drum for vaporizing moisture in the aggregate. The vapor and gases of combustion can escape through a stack 39 at the other end of the drum.

The drier A discharges the dried aggregate into the lower end of the hot elevator AB as shown in Figure 1, for feeding the gradation unit B.

*The dried aggregate elevator*

As shown in Figure 1 the elevator AB comprises a casing 40 having an inlet 41 extending under the discharge end of the drier A and an outlet 42 disposed over the top of the gradation unit B. Endless driving chains or belts such as 43 are trained around sprockets 44 in the upper and lower ends of the casing and carry buckets 45 for raising the dried aggregates from the inlet end 41 to the discharge end 42. In order to obviate the necessity for appreciable raising of the discharge end of the drier A, the lower end of the casing 40 can be disposed in a pit 46.

*The gradation unit*

Figure 7:
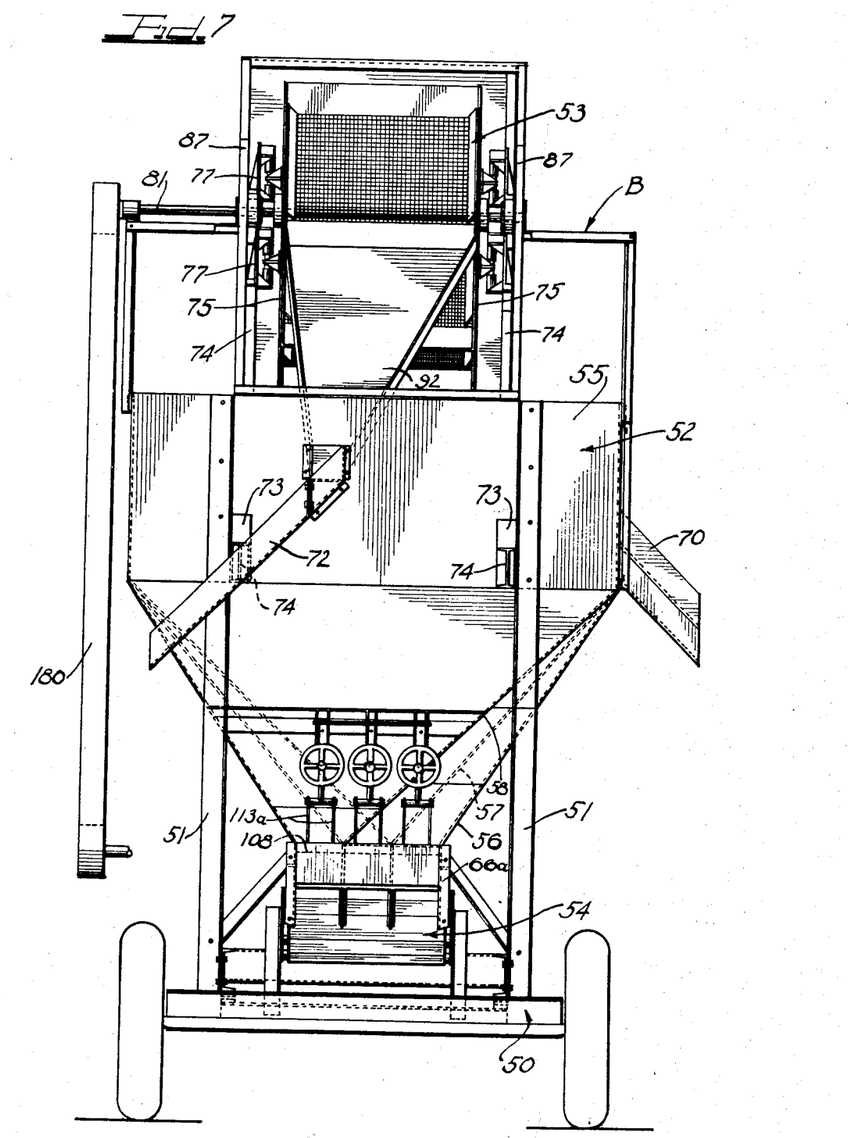
Figure 7 is a discharge end elevational view of the gradation unit shown in Figure 6.

As shown in Figures 1 and 7, the gradation unit B includes a wheeled chassis 50 carrying uprights 51 on which are mounted a bin structure 52. The wheeled chassis 50 can be jacked up or blocked as shown at 50a in Figure 1 to position the unit for use.

Figures 6, 10, 11:
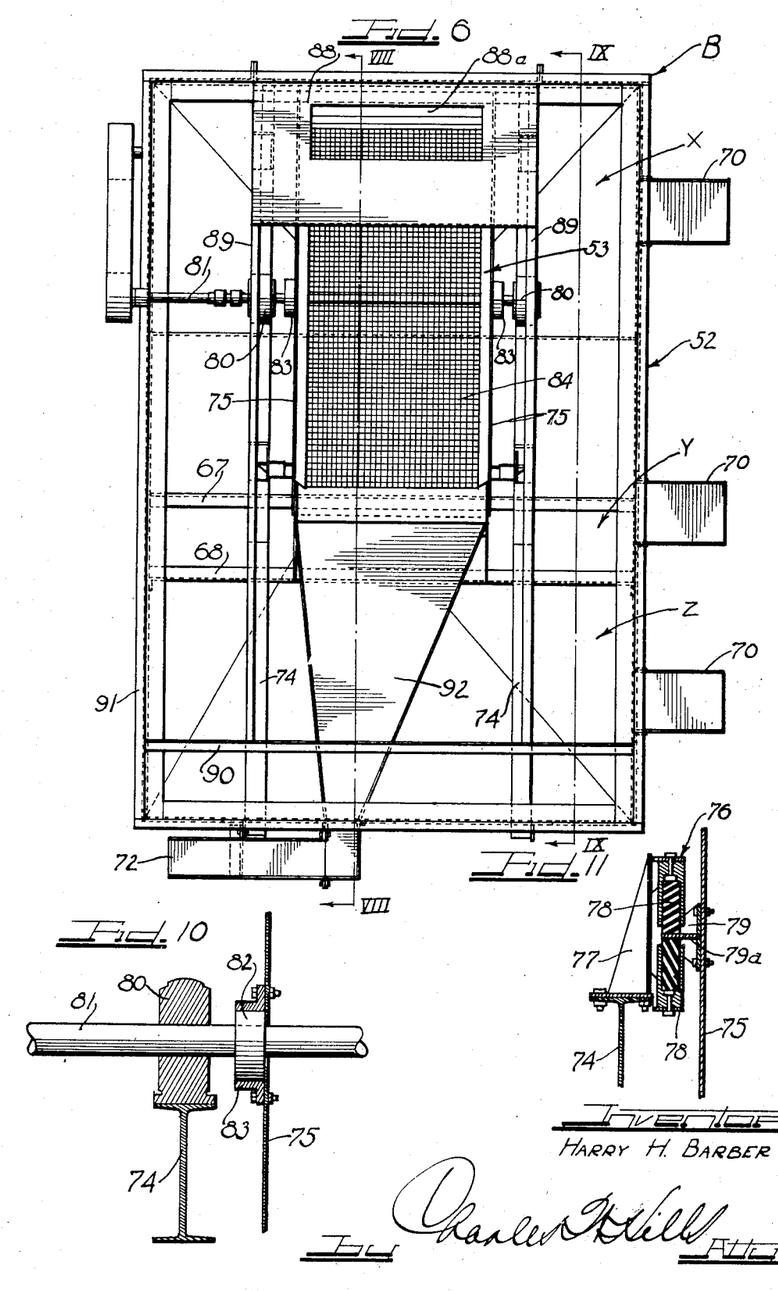
Figure 6 is a top plan view of the gradation unit "B" of the plant shown in Figure 1.
Figure 10 is an enlarged fragmentary transverse cross-sectional view, with parts in elevation, taken along the line X—X of Figure 9.
Figure 11 is an enlarged fragmentary transverse cross-sectional view, taken along the line XI—XI of Figure 9.
Figure 12:
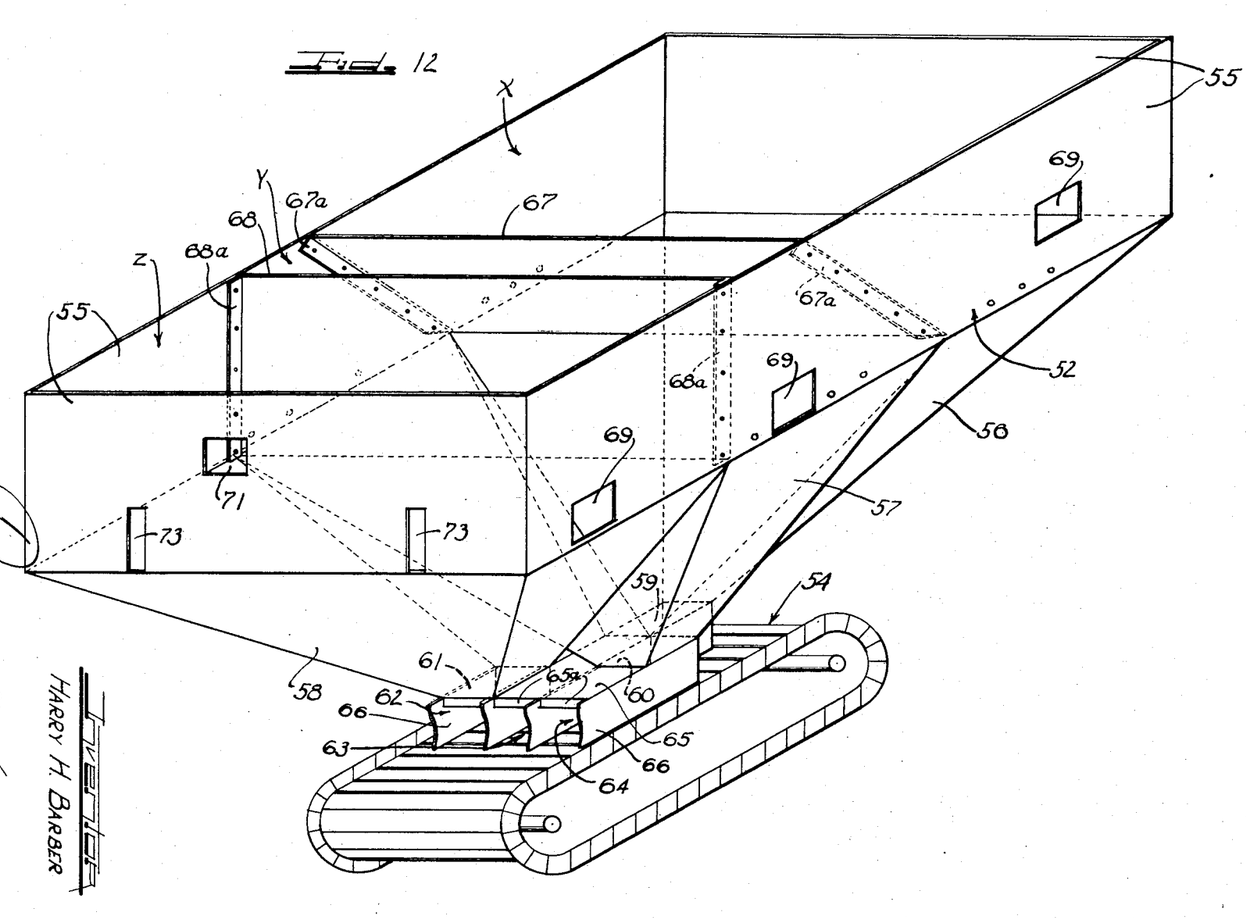
Figure 12 is an isometric view of the bin and conveyor band of the gradation unit.

A classifying screen assembly 53 is mounted at the top of the hopper construction and a conveyor belt assembly 54 is mounted under the bottom of the bin construction for moving the classified or graded aggregates to the elevator BC;

As shown in Figures 6, 7 and 12, the bin construction 52 includes an open topped rectangular bin with vertical side walls 55 extending above sloping hopper walls 56, 57 and 58 which define separate converging compartments having open bottoms 59, 60 and 61 respectively communicating with separate longitudinal channels 62, 63 and 64 defined by a top wall 65, vertical partition plates 66 and the conveyor belt of the conveyor assembly 54 as best shown in Figure 12.

A partition plate 67 spans the side walls 55 of the bin and, as shown in Figure 12, can be mounted between the side walls by means of bolts through the flanged ends 67a thereof. A second partition wall 68 also spans the side walls 55 of the bin construction and can be detachably bolted through the flanged ends 68a thereof to the side walls 55.

Three compartments X, Y and Z are thus provided by the bin construction. The first compartment X is defined by the sides, one end wall 55, the partition plate 67 and the sloping walls 56. This compartment X discharges through the opening 59 into the middle channel 63.

The second compartment Y is defined by the partition plates 67 and 68, the side walls 55 and the sloping walls 57. This compartment Y discharges through the opening 60 into one outer channel 64.

The third compartment Z is defined by the side walls 55, the other end wall 55, and the sloping walls 58 to discharge through the opening 61 into the other outer channel 62.

The bin construction thus includes three chambers or hoppers each discharging into separate longitudinal passages on the top run of the conveyor band of the assembly 54.

The three chambers or hoppers serve as temporary storage bins for classified aggregates from the classifying screens. By positioning such storage means between the drier and mixing unit it is possible to continue the mixing operation at a constant rate even though the feed from the stock piles vary. Thus the bins serve as surge units to normalize the flow through the plant.

The bin construction is compact and designed so that it will gravity feed the various aggregates to staggered outlets on a short conveyor means thereby reducing the cost of the conveyor assembly.

The outlet of the fines chamber X discharges into the middle channel 63 so that the fines in this channel will be bounded on both sides with coarser materials in the outer channels 62 and 64. In this manner, the fines which are difficult to seal in a channel on a moving conveyor means can only leak into the channels for coarser materials which are easier to seal.

Overflow openings 69 can be formed through a side wall 55 of the bin construction for communicating with chutes 70 to discharge any excess aggregate out of the respective bins X, Y and Z. The openings can be positioned in the side wall 55 at any desired level. The end wall 55 to be positioned adjacent the mixing unit C has an opening 71 therethrough to communicate with a discharged unit 72 for a purpose to be more fully described. Slots 73 are also provided in this same end wall 55 for a purpose to be hereinafter described.

The classifying screen assembly

Figure 8:
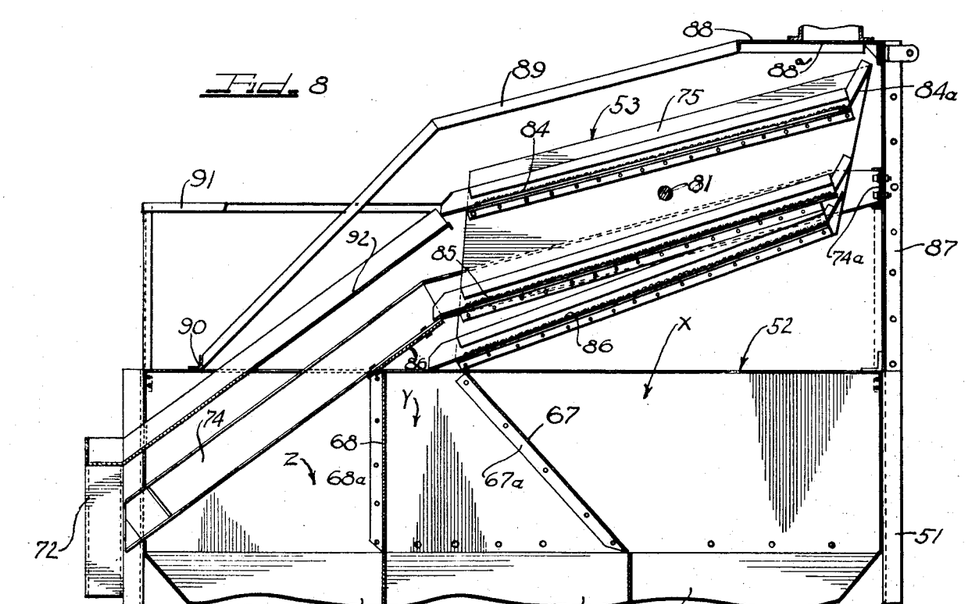
Figure 8 is a fragmentary longitudinal cross-sectional view of the upper portion of the gradation unit shown in Figures 6 and 7 and illustrating the gradation screens positioned for operation.
Figure 9:
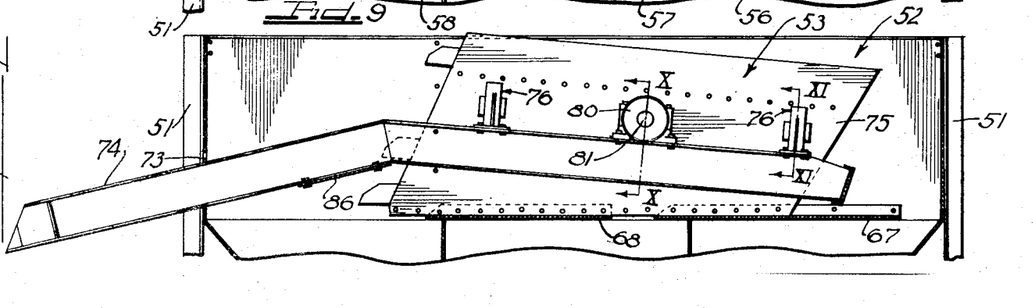
Figure 9 is a view similar to Figure 8 illustrating the gradation screens positioned for transportation of the unit to decrease the over-all height of the unit.

As best shown in Figures 6 to 9, the classifying screen assembly 53 is mounted for movement into and out of the top of the bin construction 52 and is composed of a pair of mounting beams 74 disposed through the slots 73 in the end wall 55 of the bin construction, and a connecting beam 74a at the rear ends of the beams 74. Vertical plates 75 are carried by the beams 74 through rubber block mountings 76 as shown in Figures 9 and 11. As best shown in Figure 11 brackets 77 mounted on the beams 74 carry spaced opposed upper and lower rubber blocks 78. A bracket member 79 on the plate 75 has a flange portion 79a thereof disposed between the rubber blocks 78. In this manner the plates 75 are resiliently carried from the beams 74.

As best shown in Figures 6, 9 and 10, bearings 80 are mounted on the beams 74 to rotatably support a shaft 81 which extends through both plates 75 and has eccentrics 82 thereon acting on eccentric bearings 83 secured to the plates 75. Rotation of the shaft to drive the eccentrics 82 will thus vibrate the plates and any plate-carrying structure relative to the beams 74.

Three superimposed classifying screens 84, 85 and 86 span the space between the plates 75 and are affixed to the plates in any suitable manner such as by means of bolts, rivets or the like.

To position the classifying screen assembly 53 for use detachable extension standards 87 are bolted on the top of the bin construction at the end wall thereof adjacent to the elevator AB and carry, in any one of a number of adjusted positions, the cross beam 74a at the rear end of the supporting beams 74. The screen assembly 53 thus has the screens thereof disposed in sloping relation above the top of the bin construction 52 as shown in Figure 8. When it is desired to transport the gradation unit B, however, the cross beam 74a can be disconnected from the standards 87 and the entire unit 53 can be lowered into the top of the bin. In order to permit this, however, it is necessary to move the partition plate 67 from its operative position as shown in Figure 8 to a horizontal position as shown in Figure 9. The partition plate 68 is also moved from vertical to horizontal position as shown in Figure 9. The plates 67 and 68 are bolted to the side walls 55 of the bin construction and serve as supports for the lowered screen assembly 53. The beams 74 merely slide forwardly through the slots 73 in the bin wall when the screen assembly is lowered.

A plate member 88 is also adapted to be carried at the top ends of the standards 87 and has an aperture 88a therethrough for receiving the discharge end 42 of the elevator AB. Supports 89 serving as hand rails carry the front ends of the plate 88 from a cross angle beam 90 spanning the open top of the bin near the front end thereof. Safety railings 91 can be bolted to the top of the bin around the entire screen assembly.

The top screen 84 between the plates 75 extends under the opening 88a in the feeder plate 88 and a directing apron 84a is provided to guide the aggregate onto the screen. The lower end of the screen 84 discharges into a pan 92 removably carried by the hopper and communicating with the discharge chute 72. Any very coarse aggregate pieces which do not pass through the screen 84 will thus be discharged out of the gradation unit. The screenings from the screen 84 drop onto the middle screen 85 and are discharged over a plate 86 carried by the supporting beams 74 into the bin compartment Z. Thus, the compartment Z receives coarse aggregate material.

The screenings from the middle screen 85 are deposited on the lower screen 86 and material of a size not capable of passing through the screen 86 is discharged off the lower end of the screen into the middle compartment Y.

The screenings passing through the screen 86 drop into the compartment Z.

Therefore the aggregate deposited by the elevator AB is classified into fines, middlings, and coarse particles. In addition, large rocks and other undesired large size particles are discarded. The entire screen assembly is vibrated in operation and classifying screens efficiently separate the aggregate into graded sizes.

The feature of lowering the entire screen assembly into the bin by merely swinging the partition plates 67 and 68 into horizontal position and by disconnecting the rear ends of the beams from the standards 87 makes possible a material decrease in the over-all height of the gradation unit so that the unit can readily pass under viaducts. Of course, at the same time, all of the extension members, guide rails, and the like are removed from the top of the bin.

The gradation unit conveyor

Figure 13:
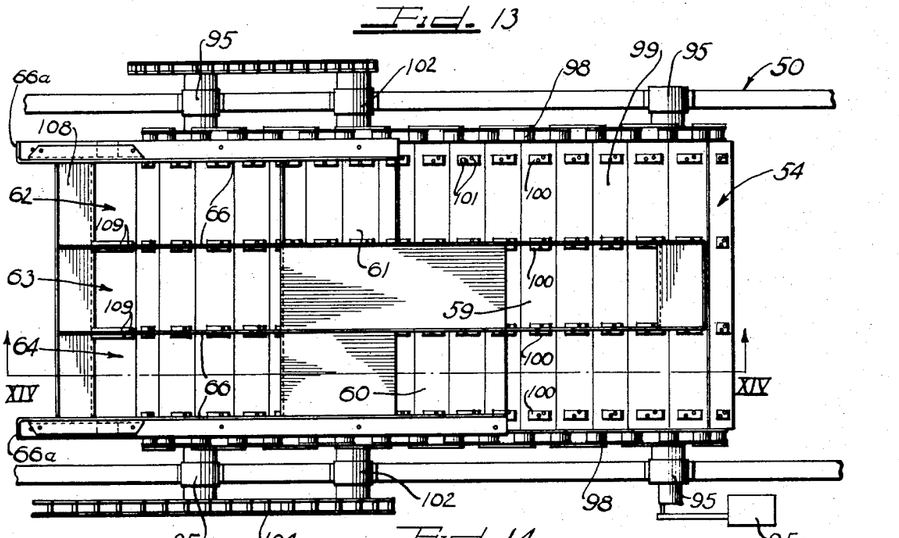
Figure 13 is a fragmentary plan view of the gradation unit conveyor band illustrating the isolated channels thereon for classified aggregate from the various bins of the unit.
Figure 14:
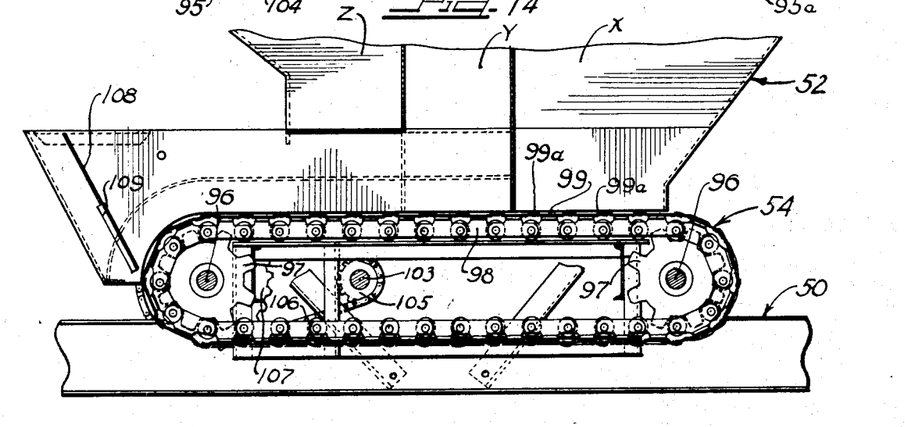
Figure 14 is a vertical cross-sectional view, with parts in elevation, taken along the line XIV—XIV of Figure 13.

The conveyor mechanism 54, as best shown in Figures 13 and 14, includes bearings 95 mounted on the chassis 50 thereof. Sprocket shafts 96 are rotatably carried in the bearings 95 and each support pairs of sprockets 97 receiving conveyor chains 98 therearound.

The conveyor chain links have plates 99 secured thereto and bridging the chains so as to form a conveyor belt. Each plate 99 has rounded complementary sliding ends 99a in overlapping relation so that the upper run of the resulting span has a continuous imperforate surface.

As shown in Figure 13, each conveyor plate 99 has four filler shoes 100 mounted thereon to pass under the partition plates 66 of the aggregate channels 62, 63 and 64. The filler shoes 100 are secured to the plates 99 by bolts 101 and serve to build up the curved plates 99 to fit flush with the bottoms of the partition walls 66. The filler shoes are desirable since the plates 99 have the rounded ends 99a thereof extending above the middle portions thereof and these middle portions must therefore be spaced below the bottoms of the walls 66 while the end portions 99a ride on the walls. As a result, aggregates could wedge between the walls and plates to become crushed by the moving conveyor and effect wear on the parts. The filler shoes seal of these spaces between the wall bottoms and the depressed central portions of the conveyor plates to prevent any such wedging, crushing and wear.

The chassis 50 has another pair of bearings 102 mounted thereon for rotatably carrying a drive shaft 103 which is chain driven at one end thereof from a chain 104. The other end of the shaft 103 has a gear 105 thereon driving a chain 106 trained around a gear 107 on a sprocket shaft 96.

The conveyor assembly 54 thus moves the graded aggregate along the separated channels 62, 63 and 64 from the bin openings 59, 60 and 61 to a sloping terminal plate 108 spaced above and forwardly from the forward end of the conveyor band.

Figure 22:
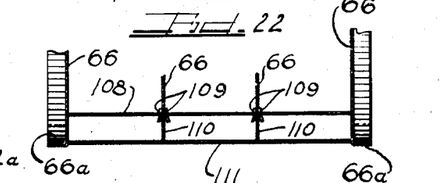
Figure 22 is a cross-sectional view taken along the line XXII—XXII of Figure 18.

The intermediate partition plates 66 have side plates 109 secured thereon beneath the terminal plate 108 to define therebetween tracks or guides for partitioning webs 110 of a slide 111 as best shown in Figure 22. The slide 111 is positioned behind the terminal plate 108.

The outer partition walls 66 have outturned flanges 66a for attachment to the casing of the elevator BC.

Figures 15, 16, 17:
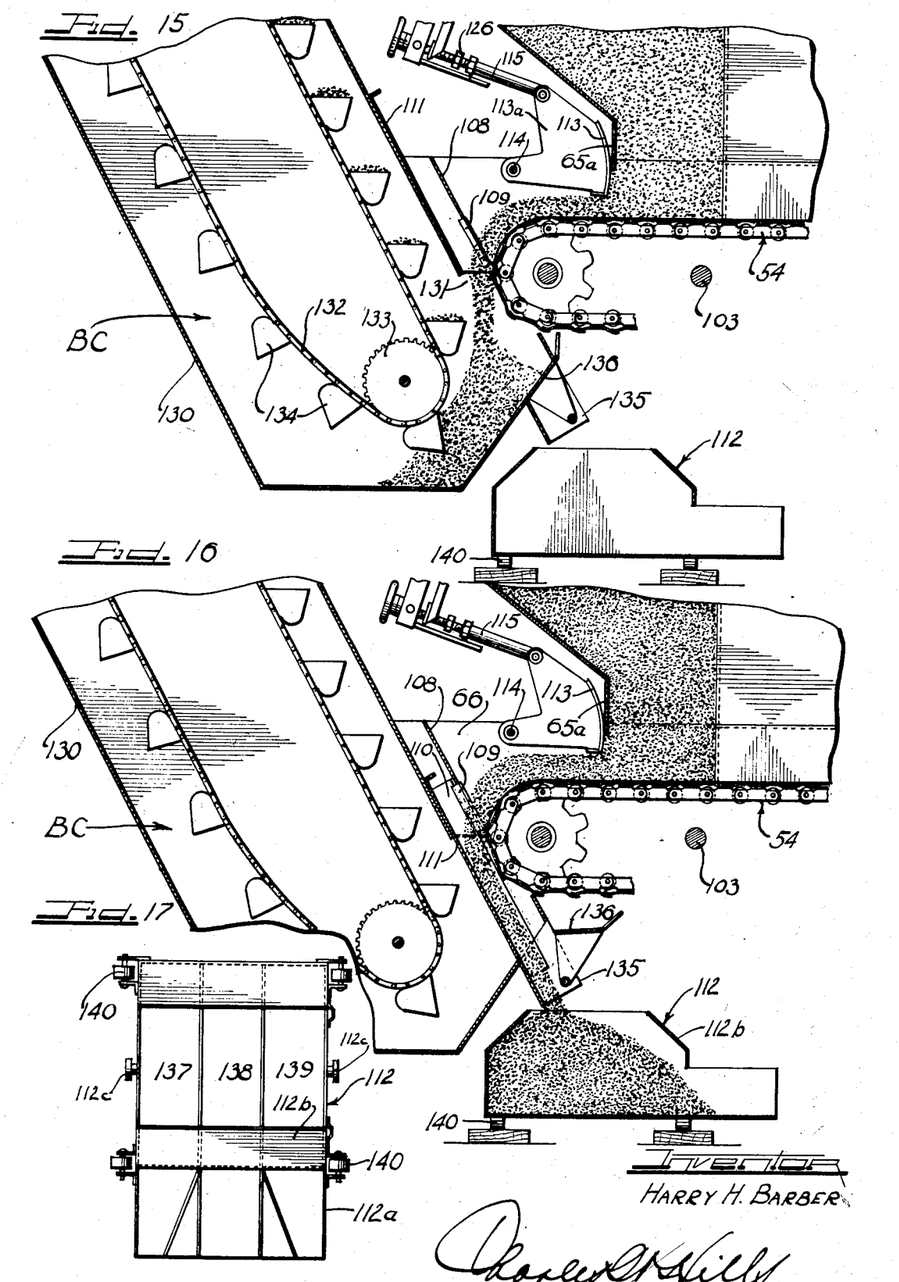
Figure 15 is a fragmentary vertical cross-sectional view, with parts in elevation, illustrating the proportioning structure between the gradation unit and the elevator to the mixing unit.
Figure 16 is a view similar to Figure 15 and illustrating the manner in which the proportioning gates are calibrated.
Figure 17 is a plan view of the test box shown in Figures 15 and 16 for receiving graded aggregate from the gradation unit to make possible the convenient calibration of the unit.

As shown in Figures 15 and 16, aggregate on the conveyor belt of the conveyor assembly 54 is discharged under the terminal wall 108 from each channel either into the elevator casing or into a test or sample box 112 depending upon the position of the slide 111.

The proportioning gates

Figure 20:
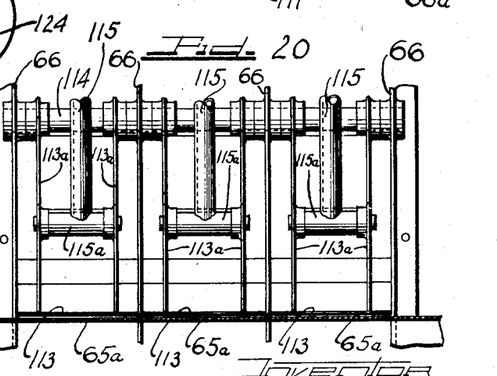
Figure 20 is a cross-sectional view, with parts in elevation, taken along the line XX—XX of Figure 18 illustrating the multi-gate structure of the gradation unit.

As shown in Figures 12, 15, 16 and 18, skirt portions 65a depend from the top wall 65 of the channels 63 and 64, and from the hopper wall 58 into the channel 62 in spaced relation from the terminal wall 108. These skirt portions are in transverse alignment across the three channels and a gate 113 is mounted in front of each skirt portion 65a, for controlling the effective discharge size of each channel 62, 63 and 64. As shown in Figure 20, each gate 113 has a pair of webs 113a extending forwardly therefrom and swingably mounted on a shaft 114 carried by the outer partition walls 66. Each gate is thus individually swingable from the same supporting shaft 114.

Control arms 115 have transverse end pieces 115a between the webs 113 of each gate which are pivotally connected to the webs.

Figure 18:
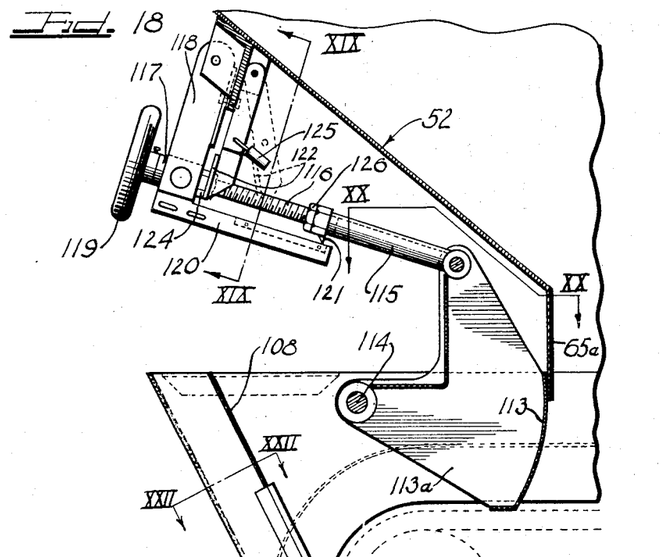
Figure 18 is a somewhat enlarged vertical cross-sectional view, with parts in elevation, of a calibrating gate illustrating the manner in which the gate is adapted to be locked in calibrated position.

As shown in Figure 18, a screw rod 116 is threaded into each control arm 115. Each screw rod 116 is rotatably mounted in a bearing boss 117 swivelly supported from brackets 118 fixed to the bin construction 52. The screw rods 116 are manually rotated by means of hand wheels 119 secured to the ends thereof. Rotation of the hand wheels effects movement of the control arms 115 toward and away from the brackets 118 to open and close the gates 113.

Each of the brackets 118 carry an indicating scale such as 120. A finger 121 is mounted on each control arm 115 to ride adjacent the scale 120 for the purpose of indicating the gate opening in inches.

Figure 19:
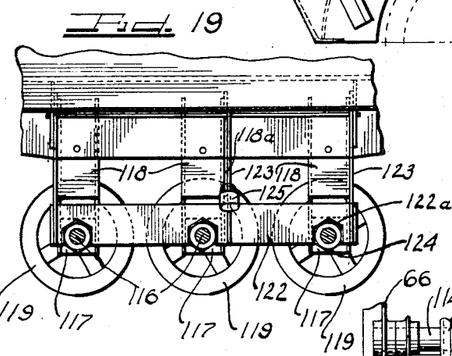
Figure 19 is a cross-sectional view, with parts in elevation, taken along the line XIX—XIX of Figure 18 illustrating the manner in which a plurality of the gates are adapted to be locked by a single locking means.

Unauthorized movement of the gate is prevented by means of a locking device (Figures 18 and 19) including a lock bar 122 swingably mounted from the hopper construction 52 on arms 123 and having recesses 122a therein adapted to receive hexagonal nuts 124 welded to the screw rods 116.

A fixed bracket web 118a is positioned adjacent one of the arms 122 and the web and arms are apertured to receive a lock 125 for holding the locking bar 122 in locking position with the nuts 124 in the recesses 122a. When adjustment of the gates is necessary the lock 125 can be removed and the lock bar 122 can be swung away from the nuts 124 as shown in dotted lines in Figure 18 to permit rotation of the hand wheels 119. As the screw rods 116 are threaded into and out of the tubular control arms 115, the fingers 121 will move along the scale 120 to indicate the degree of opening of each gate.

A lock nut 126 can also be provided on each screw rod 116 for preventing rotation of the screw rod even when the locking bar is opened until the lock nut 126 is spaced from the tubular arm 115.

The elevator feed to the mixer unit

The elevator BC, as shown in Figure 1, is preferably part of the graduation unit B and includes a casing 130 (Figures 15 and 16) directly secured to the outturned flanges 66a of the walls 66. This casing 130 has an inlet opening 131 as shown in Figures 15 and 16 adapted to receive material from the conveyor assembly 54 of the unit B. The material thus drops to the bottom of the casing 130 as shown in Figure 15 provided that the slide 111 controlling the opening 131 is in its up position. The usual bucket chains 132 are mounted around sprockets 133 in the casing and move elevator buckets 134 mounted thereon into the pile of aggregate deposited into the casing by the conveyor assembly up to the top of the casing for discharging onto a belt of the mixer unit.

When it is desired to calibrate the proportioning gate 113 so as to obtain the desired mix of aggregate sizes the slide 111 is moved to the position shown in Figure 16 for closing off the inlet to the casing 130. A chute 135 depends from the casing 130 beneath the slide 11 and is controlled by means of a gate 136 whereby, when the gate is closed as in Figure 15, the aggregate will be deposited into the casing and whereby, when the slide 11 is closed and the gate 136 is opened, the aggregate will discharge out of the end of the chute 135.

Calibration of the gradation unit

When the slide 111 is closed and the gate 136 is opened the slide webs 110 will form continuations of the isolated channels 62, 63 and 64 so that the aggregate from each bin compartment will not be mixed. A test box 112 is moved under the chute 135 and has three compartments 137, 138 and 139 therein adapted to receive the aggregate from the three channels. The chute 135 is also partitioned so that it will provide three channels registering with the channels 62, 63 and 64 and with the compartments 137, 138 and 139 of the test box. The test box 112 is preferably mounted on rollers 140 so that it can be conveniently moved under the chute 135.

The box 112 has a partitioned pouring spout 112a and a pouring shield 112b to enable the box to be tilted for discharging the contents of the compartments 137, 138 and 139 into separate barrels or the like containers for weighing each graded size of the aggregate.

For calibration purposes, the gates in each bin are set at some specified gate opening, such as one inch, the slide 111 is closed and the gate 136 is opened as in Figure 16. The test box is rolled under the chute 135 as shown.

The conveyor belt of the conveyor assembly 54 is driven to discharge the graded aggregate into the separate compartments of the box for a period long enough to fill the box. The test box is then rolled out, lifted by means of a hoist (not shown) hooked on lugs 112c of the box, and each aggregate is discharged into a drum. The procedure is repeated two or three times or until enough aggregate is obtained to fill the drums.

After sufficiently large drum samples have been obtained in order that scale errors in weighing will not be a serious factor in the total weight, the number of revolutions of the conveyor belt drive shaft or sprocket shaft is noted from a counter 95a eccentrically connected to the foot shaft 96 of the conveyor assembly.

Each drum is then carefully weighed and the net weights are divided by the number of revolutions giving the pounds per revolution flow for a one inch gate opening on each size aggregate. The above procedure is repeated for a series of gate openings such as one inch, three inch, five inch and seven inch. The entire apparatus can be calibrated right on the job in a period of not more than one or two hours.

Figure 21:
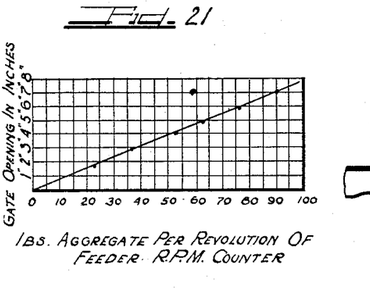
Figure 21 is a chart illustrating the calibration of the gradation unit in terms of pounds of aggregate per revolution of feeder of the unit for various gate openings.

The results are plotted on a graph such as is shown in Figure 21 showing inches of gate opening versus pounds of aggregate per revolution of the gradation unit conveyor shift.

The engineer in charge of the job then has his own record of flow available for the particular aggregate to be used, and he can select proper gate openings to give the desired over-all grading of the aggregate and to give the correct weight of aggregate for the asphalt percentage. Once the gates are set in accordance with specified aggregate mix, the engineer can padlock the controls by the locking device described above so that no variation will creep in.

The mixing unit

Figure 24:
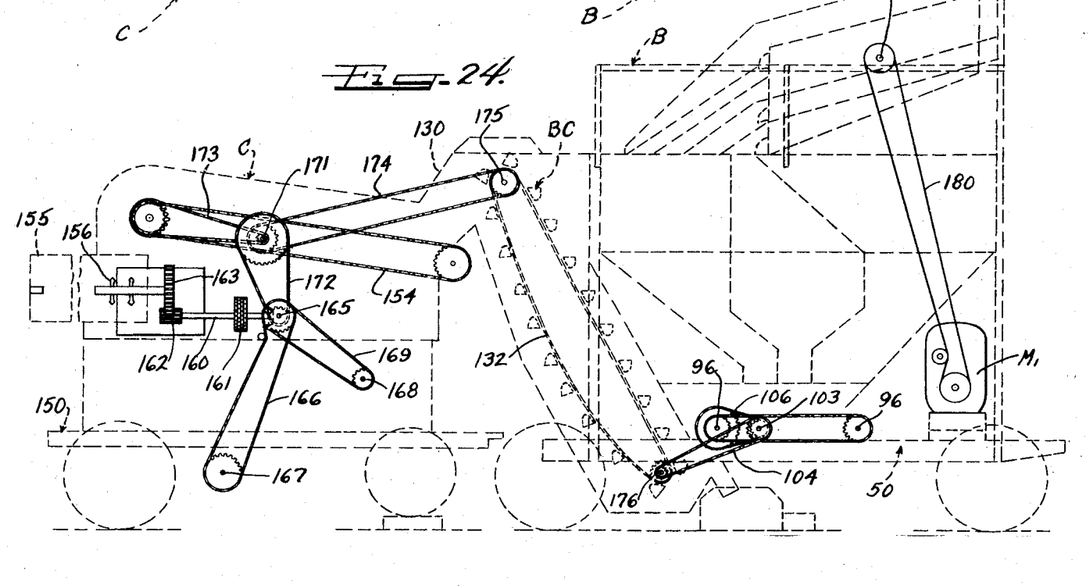
Figure 24 is a side elevational view of the driving connections for the gradation unit and the mixing unit and illustrating these units in dotted lines.

The mixing unit C, as shown in Figures 1, 5 and 24 is mounted on a wheeled chassis 150 and includes a tank 151 for the bituminous material. This tank is adapted to be heated by suitable means not shown. The bituminous liquid is pumped out of the tank 151 through a pipe line 152 by means of a metering pump 153 as indicated in Figure 5.

The elevator BC discharges the graded aggregate onto the top run of a conveyor belt 154 mounted on the mixing unit C. The belt 154 discharges the aggregate into a pug mill 155 having agitating blades 156 rotatably mounted therein. The bitumen liquid is sprayed into the pug mill 155 onto the aggregate through spray heads such as 157. The spray is preferably directed into the continually falling stream of aggregate from the belt 154.

The pug mill 155 thoroughly mixes the aggregate to uniformly combine all of the aggregate sizes and at the same time to thoroughly mix the bitumen liquid with the aggregate.

The finished paving material is discharged out of the end of the pug mill remote from the belt 154. The pug mill 155 is at a height convenient for the running of trucks thereunder to receive the finished aggregate.

The correlated drives for the mixing unit and gradation unit

Figure 23:
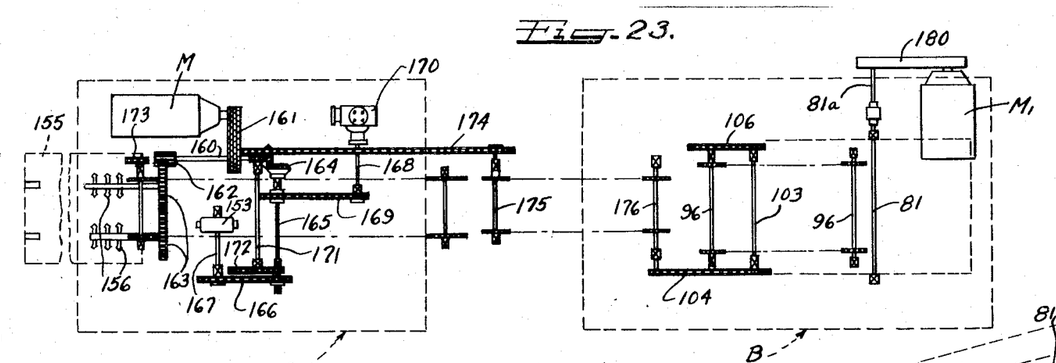
Figure 23 is a plan view of the driving assemblies for the gradation unit and mixing unit of the plant illustrating these units in dotted lines.

As shown in Figures 23 and 24 a main motor M mounted on the mixing unit C drives the shaft 160 through the driving chains 161. The shaft 160 carries a pinion 162 for driving the gear train 163 to rotate the shafts of the pug mill agitators 156.

A pair of meshing bevel gears 164 driven by the shaft 160 in turn drive a second shaft 165 from which is driven through a chain 166 the shaft 167 of the pump 153. This same shaft 165 also drives a second pump shaft 168 through a chain and sprocket drive 169. The pump shaft 168 operates a second pump 170 for the purpose of transferring the binder from trucks to the tank 151.

The shaft 165 also drives a shaft 171 through a chain and sprocket drive 172. This shaft 171, in turn, drives a chain and sprocket assembly 173 for driving the conveyor belt 154. Another chain and sprocket assembly 174 driven by the shaft 171 drives the upper sprocket shaft 175 of the elevator BC. The elevator chains 132 driven by the sprocket shaft 175 in turn drives the lower sprocket shaft 176 of the elevator which shaft drives the chain 104 described hereinabove for operating the conveyor assembly 54.

Therefore the single motor M drives the pug mill, the metering pump on the mixing plant, the conveyor 154, the elevator BC, and the conveyor 54 of the gradation unit B.

A second motor M1 is mounted on the gradation unit B and drives a belt 180 for rotating the screen assembly shaker shaft 81. The belt 180 is readily removed and the shaft 81 has a disconnectible portion 81a projecting through the bin wall so that it can be readily removed for permitting the shaker assembly to be lowered into the bin.

Thus while the degree of shake of the screen is independent of any other mechanism, all of the movable elements handling the graded aggregate are driven in properly timed relation from a single prime mover and even the pump for the bitumen are driven in proper timed relation in accordance with the speed of movement of the aggregate. Therefore, all of the elements handling graded aggregate and handling the bitumen for the production of the paving material are always in proper timed relation and the properly proportioned graded aggregate is fed in proper amounts to the pug mill where it is admixed with the proper metered amounts of bitumen from the pump 153 at the proper mixing speed controlled by the pug mill agitators 156. At the same time the only driving connection between the units B and C is the chain 174 which is readily removable from the units when it is desired to separate the same for transportation. The casing 130 of the elevator BC is adapted to be bolted to the top of the mixing unit C so that it will discharge onto the conveyor belt 154 and automatically maintain the shafts 171 and 175 in proper spaced relation for receiving the chain 174 on the respective sprockets carried by the shafts.

Summary

From the above descriptions it will be understood that the mixing plants of this invention are composed of readily assembled portable units for continuously drying, grading, proportioning and admixing proportioned aggregates with binder materials to produce road paving mixes. The plants of this invention are conveniently set up either near a source of raw aggregate material, or near the paving job. The portable units can be moved to any convenient location for assembly into the central plant without delay and without the assistance of expert engineering services.

The plants are adapted for the production of hot asphaltic mixes at points closely adjacent the paving job so that the paving material will not materially cool before it is laid.

The raw aggregate is rigidly graded and classified by the gradation units of the invention and continuous operation is made possible by the proportioning gate assembly of the gradation unit which is readily calibrated by means of a testing apparatus described above.

The continuous flow of the material through the plant makes possible the treatment of small amounts of material for each operation thereby insuring uniformity not possible in batch processes. At the same time, however, the continuous flow feature greatly speeds up production and makes possible higher capacities on smaller apparatus.

Once the gradation unit has been calibrated for the particular type of aggregate to be used on any paving job, the plant can be moved to various locations without recalibration. At the same time the ready calibration test features make it possible for state and county engineers to check the plant whenever they desire.

Aggregate grade specifications can be rigidly adhered to and changed whenever desirable by mere resetting of the proportioning gates.

The desired relative proportions of binder and aggregate can also be rigidly maintained since the binder metering pump and classified aggregate feeders to the pug mill are driven from the same prime mover. Further the metering pump can, if desired, be quickly reset to increase or decrease the binder feed without changing the aggregate feed.

I claim as my invention:

1. An aggregate classifying and proportioning device comprising a mobile unit having a plurality of bins for different sized aggregates, means defining longitudinally and transversely spaced outlets for said bins, an endless band type conveyor mounted under the bin outlets, means including a top and side walls for defining isolated channels on the top run of said conveyor each in communication with a bin outlet, and individually controlled gate means transversely aligned across said conveyor for proportioning the relative rate of aggregate discharge out of said channels.

2. A gradation unit adapted for classifying and proportioning aggregate which comprises an open top bin having a plurality of separate hopper-like bottoms each converging to spaced outlet openings, movable partition walls in said bin, a classifying screen assembly mounted for movement into and out of said bin and adapted, when disposed in said bin, to be supported on the movable partition walls, and means for directing aggregate from said screen assembly into the respective hopper-like bottoms.

3. An aggregate classifying device comprising a multi-compartment bin, a classifying screen assembly having supporting legs slidable through a wall of the bin, an extension assembly adapted to be mounted on said bin for cooperation with said legs to carry the screen assembly above the bin, and interior partition walls adapted to be moved in the bin from bin dividing position to screen assembly supporting position whereby said extension assembly may be removed from said bin, said legs projected through the bin walls and said screen assembly lowered onto the supporting partition walls to be carried inside the bin.

4. A compact bin construction adapted for supplying classified aggregates to a conveyor means which comprises a bin having a plurality of hopper bottoms converging to a plurality of separate outlets disposed in longitudinally staggered relation across the width of the conveyor means.

5. A gradation unit comprising a bin construction having chambers for fine, medium and coarse sized aggregates respectively, a conveyor means mounted under the bin construction, means defining inner and outer tunnels bottomed on the conveyor means, and hopper-like bottoms on said bin chambers converging into said tunnels for discharging the fine aggregate into the inner tunnel and the medium and coarse aggregates into the outer tunnels whereby the sealing of the fines in the tunnel will be aided by the coarser particles in the outer tunnels.

6. An aggregate classifying device comprising an open topped bin having three individual sloping bottom portions converging to individual outlets, partition plates in said bin for continuing the interior walls of the bottom portions to the top of the bin, means adapting said partition plates for mounting in substantially horizontal position in said bin below the top thereof, a substantially U-shaped frame having legs slidable through an end wall of said bin, an extension assembly attachable to said bin for supporting the bight of the U-shaped frame above the bin, a multi-screen classifying assembly movably mounted between the legs of said frame, and means for vibrating said assembly relative to the frame whereby said extension assembly may be removed from the bin and said frame may be lowered into the bin for supporting the screen assembly on the partition plates when the latter are disposed in horizontal position in the bin to decrease the over-all height of the classifying device and adapt the same for transportation.

7. A gradation unit comprising a wheeled chassis, a multi-compartment bin supported on said wheeled chassis including removable interior partition wall portions, a classifying screen assembly mounted on said bin for movement into the bin when the partition wall portions are removed, removable means attachable to the bin for carrying the screen above the bin during operation, a plurality of superimposed classifying screens in said screen assembly, and means for directing classified aggregates from the screens into the various bin compartments to isolate the classified aggregates.

8. A gradation unit comprising a conveyor means, stationary partition walls and a top wall defining isolated channels on said conveyor means, bins for discharging classified aggregates into said channels, and gates controlling the relative amounts of aggregates discharged out of the channels by the conveyor means.

9. An aggregate gradation unit comprising a gradation bin having compartments receiving classified aggregates, means for conveying aggregates mounted under said bin, stationary partition plates and a top wall defining isolated channels on the conveyor means, means connecting each of said bin compartments with a channel, gates movable in said channels toward and away from the conveyor means for proportioning the relative amounts of aggregate moved by the conveyor means through the channels, and means for selectively directing the aggregate discharged off the end of said conveyor means along predetermined paths.

10. A gradation unit comprising a wheeled frame having spaced frame beams, a pair of sprocket carrying shafts bridging said beams and carried thereby, a pair of chains trained between the sprockets of said shafts, metal plates having curved marginal portions connecting said chains to form a flexible conveyor band with the curved marginal portions in overlapping relation, a plurality of filler shoes carried by each of said plates between the curved portions thereof, and a plurality of partition walls mounted above the upper run of said conveyor band receiving the plates and filler shoes thereunder whereby channels are provided along the upper run of said belt which are sealed along the sides thereof by the filler shoes.

11. In an aggregate conveyor assembly including a conveyor band composed of plates with raised overlapping portions, and partition plates above the upper run of the band defining isolated channels therealong bottomed by the band, the improvement which comprises filler shoes carried by the plates of the band between the raised portions thereof and extending into flush relation with the raised overlapping portions to ride on the partition plates and prevent leakage from the channels.

12. In a conveyor assembly including a conveyor band and channel forming walls along the upper run of said band, the improvement which comprises filler shoes on the conveyor band having flat upper faces in flush relation along the upper run of the band to ride on the bottoms of the channel walls in sealing engagement therewith.

13. A gradation unit comprising a hopper construction having compartments for classified aggregates, an endless conveyor band movable under the hopper construction, means defining isolated channels connecting the compartments of the hopper construction with the upper run of the conveyor band to maintain aggregates on the conveyor band in segregated relation, gates for proportioning the relative amounts of aggregates moved by the band through said channels, a casing adapted to receive the aggregates from the end of the conveyor band, a slide closing communication between the casing and the aggregate channels, plates cooperating with said slide to continue the channels around the end of the conveyor band, and sampling means for separately receiving the aggregate from each channel whereby the gates can be calibrated in accordance with the relative weights of the sampled aggregate classes.

14. In a conveyor assembly having isolated channels along the upper run thereof for transportation of classified material, the improvements which comprise proportioning gates movable into said channels toward and away from the upper run of the conveyor for regulating the relative amounts of materials moved through the channels by the conveyor, a terminal plate at the discharge end of the conveyor receiving the material thereunder, and a removable guide means behind said terminal plate forming a continuation of said channels to maintain the isolated relation of the material.

15. In a conveyor assembly having isolated channels along the upper run thereof, the improvements of gates movable in said channels toward and away from the upper run of the conveyor for proportioning the relative amounts of materials moved through the channels by the conveyor, an elevator casing adjacent the end of the conveyor adapted to receive the material from said channels, and a slide having partition walls forming continuations of the channels movable over the elevator casing to deflect the materials from the channels without mixing the same together.

16. In a classified aggregate conveying mechanism including a conveyor belt having an upper run receiving the classified aggregates thereon and an elevator casing receiving the aggregates discharged off the end of said belt, the improvements of means defining isolated channels on the upper run of said belt to maintain the classified aggregates in segregated relation, gates movable in said channels toward and away from said belt to proportion the amounts of aggregates moved through the channels by the belt, guide means movable over the elevator casing defining continuations of said channels for deflecting the material without mixing the same, and a sampling chute adapted to receive the deflected material, whereby the materials discharged out of said chute can be weighed for calibrating the gates.

17. In an aggregate conveyor assembly having isolated channels for moving separate materials, the improvements which comprise gates pivotally supported from the channel walls movable toward and away from the conveyor to proportion the relative amounts of materials moved through the respective channels, screw rod means for raising and lowering said gates, and a locking bar for locking all of said screw rods to prevent unauthorized manipulation of the gates.

18. A conveyor assembly including a conveyor band defining a substantially continuous surface for conveying material, means defining a plurality of separate channels on said surface, gates pivoted on said means and movable into the channels toward and away from said surface, tubular control arms pivoted on said gates, actuating screw rods threaded into said control arms, bearing bosses mounting said screw rods, and hand wheels for operating said screw rods whereby manipulation of the hand wheels rotates the rods in their bearing bosses to thread the same into and out of the tubular control arms for raising and lowering the gates.

19. In a conveyor assembly having a gate controlling the amount of material moved by the conveyor, the improvement which comprises a fixed bracket, a bearing swivelly carried thereby, a screw rod rotatable in said bearing for operating said gate, a polygonal portion around said screw rod, a swingable locking bar having a polygonal recess adapted to receive said portion to prevent rotation of the screw rod and means for locking the bar in fixed position with the portion seated in the recess whereby said gate is locked in adjusted position.

20. In a mixing plant for the continuous production of binder coated road paving materials having a gradation unit for classifying aggregates and a pug mill unit for binder coating and mixing the classified aggregates, the improvements which comprise means defining isolated paths for the classified aggregates, a single conveyor forming the bottom of all of said paths, proportioning gates in said paths, means for delivering aggregates passing through said gates to the mixing unit, and means for diverting the passage of aggregates to said mixing unit along isolated paths for obtaining test samples of each aggregate passing through each gate to facilitate calibration of the gate openings in accordance with weighed test samples whereby uniform known proportions of aggregates will be continuously delivered to the mixing unit.

21. In a plant adapted for the continuous production of road paving materials including a gradation unit and a continuously operating mixing unit, the improvements which comprise means for flowing isolated streams of classified aggregates, means for continuously delivering the classified aggregates from said streams to the mixing unit, proportioning gates controlling the relative amounts of aggregates discharged from said streams, and means adapted to be interposed between the proportioning gates and the delivering means for diverting the flowing streams of aggregate without mixing the same together.

22. A plant for the continuous production of binder coated aggregates comprising a plurality of bins for graded aggregates, means for continuously moving each aggregate from the bins along separate paths, gates for continuously volumetrically proportioning the aggregates discharged from the paths, means for calibrating said gates to discharge the aggregates at known relative weight rates, and means for coating the proportioned aggregates with a binder.

23. In a plant adapted for the continuous production of volumetrically proportioned aggregate sizes calibrated on a predetermined relative weight basis, the combination of means for continuously flowing a plurality of streams of aggregates each having a different size range, a proportioning gate for each stream to control the relative amounts of aggregates discharged from said means, a continuously operating aggregates mixer, delivery means for continuously delivering the proportioned aggregates to said mixer and sampling means adapted to be interposed between the gates and the delivery means for temporarily diverting separate streams of aggregates whereby samples of the different sized aggregates can be weighed to calibrate the gates for the volumetric proportioning of the aggregate sizes on a predetermined relative weight basis.

24. Apparatus adapted for the continuous production of volumetrically proportioned aggregate sizes calibrated on a predetermined relative weight basis which comprises means for continuously flowing a plurality of streams of aggregate each having a different size range, a device cooperating with each stream to control the relative amount of aggregate discharged from said means, delivery means for delivering the aggregates discharged by said means, and a sampling device adapted to be interposed between said devices and the delivery means for temporarily diverting separate streams of aggregates whereby samples of the different sized aggregates can be weighed to calibrate the devices for the volumetric proportioning of the aggregate sizes on a predetermined relative weight basis.

25. Apparatus adapted for the continuous production of proportioned aggregate sizes calibrated on a predetermined relative basis which comprises means for flowing a plurality of streams of aggregates each having a different size range, a device cooperating with each stream to control the relative amounts of aggregates discharged from said means, delivery means receiving the aggregates from said means, and a sampling device adapted to be interposed between said devices and said delivery means for temporarily diverting separate streams of the aggregates, whereby samples of the different sized aggregates can be obtained and measured for proportioning the relative amounts of the aggregates discharged from said means on a known basis.

HARRY H. BARBER.